March 7, 1967     E. L. W. JOHANSSON     3,307,890
ROLLING BEARING MOUNTING
Filed April 6, 1964
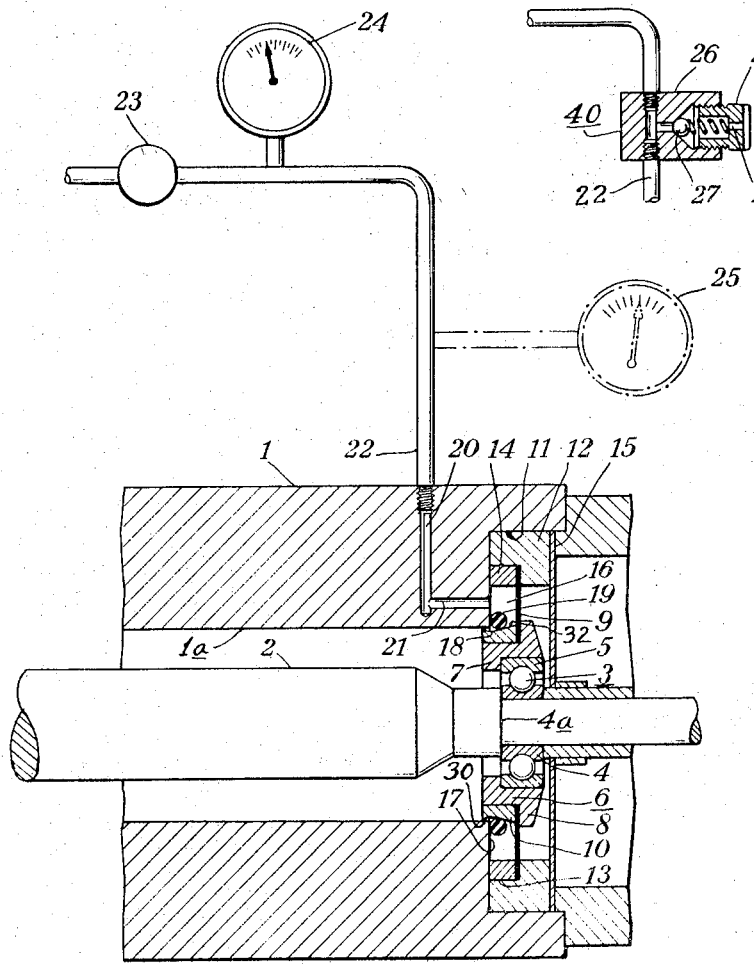
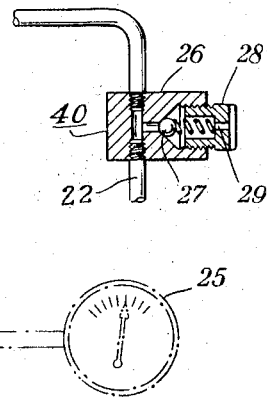
INVENTOR:
ERIK LENNART WALDEMAR JOHANSSON

United States Patent Office 3,307,890
Patented Mar. 7, 1967

3,307,890
ROLLING BEARING MOUNTING
Erik Lennart Waldemar Johansson, Goteborg, Sweden, assignor to Aktiebolaget Svenska Kullagerfabriken, Goteborg, Sweden, a corporation of Sweden
Filed Apr. 6, 1964, Ser. No. 357,376
Claims priority, application Sweden, Apr. 18, 1963, 4,249/63
5 Claims. (Cl. 308—189)

The present invention relates to a rolling bearing mounting. More particularly the present invention relates to a mounting for supporting a rolling bearing including means for adjusting the play in the bearing during running.

The bearing mounting of the present invention is adapted for use for example in a grinding machine to support the machine tool spindle which runs at high speeds and wherein it is essential to achieve accurate and vibrationless running.

An important objective of the present invention is to provide a mounting arrangement for a rolling bearing characterized by novel features of construction and arrangement facilitating an accurate adjustment of the bearing during operation thereof. In the form of the invention as illustrated in the drawings, this end is accomplished by providing a chamber surrounding the bearing which amy be pressurized and wherein the pressure in the chamber may be varied selectively. By this arrangement, the bearing may be preloaded by pressurizing the chamber thereby to eliminate play. In the event that deviations occur, due for instance to variations in the grinding wheel and feed, changes in shape in the work piece or other reasons, the pressure in the chamber may be adjusted during running to obtain the desired normal running condition. Furthermore by this arrangement, deviations in the bearing construction which might manifest itself in the form of a wobble, and any other inaccuracies in the bearing or its mounting are automatically compensated for by the pressurized chamber. In the illustrated form of the invention, a diaphragm forms one wall of the chamber and means is provided for maintaining the chamber leak proof so that a constant pressure condition can be maintained.

With the foregoing in mind, an object of the present invention is to provide a mounting for a bearing characterized by novel features of construction and arrangement to provide an extremely quiet running assembly.

Another object of the present invention is to provide a bearing mounting including an enclosed chamber surrounding the bearing which may be selectively pressurized to regulate the axial pressure on the bearing thereby to eliminate play and provide optimum running conditions for the bearing.

A further object of the present invention is to provide means for selectively regulating the pressure in the chamber so that the optimum conditions may be achieved thereby to compensate for a number of variations in the assembly in which the bearing is mounted, for example a grinding machine during operation thereof.

These and other objects of the present invention and the various features and details of the operation and construction thereof are hereinafter more fully set forth with reference to the accompanying drawing, wherein:

FIG. 1 is a fragmentary sectional view through one end of the spindle of a grinding machine and embodying the bearing mount in accordance with the present invention; and FIG. 2 is a fragmentary enlarged sectional view of a control valve for use in the system illustrated in FIG. 1.

Referring now to the drawings and particularly FIG. 1 thereof, there is shown apparatus embodying a bearing mounting arrangement in accordance with the present invention. In the present instance the bearing mounting arrangement is illustrated in connection with a grinding machine, the grinding wheel mounting portion of which is shown in FIG. 1. The illustrated portion of the grinding machine includes a spindle housing 1 having a spindle 2 rotatably mounted therein. The spindle 2, as illustrated, is supported in the housing in a rolling bearing 3, in the present instance a deep groove ball bearing, including the usual inner and outer rings 4 and 5 and a plurality of balls in the annular space between the rings. The spindle 2 is of stepped configuration and the bearing inner ring 4 is mounted on a seat abutting against a shoulder 4a on the spindle 2. The bearing outer ring 5 is mounted in the spindle housing 1 by means of a bearing mounting constructed in accordance with the present invention.

Even though the bearing mounting of the present invention is illustrated in connection with a grinding machine and a deep groove ball bearing, it is to be understood that it has application to other types of apparatus and other types of rolling bearing assemblies.

The bearing mounting of the present invention includes a sleeve 6 within which the bearing outer ring 5 is seated, the sleeve 6 having a radial flange 7 against which one axial end face of the outer bearing ring 5 abuts. The annular sleeve 6 also has an outwardly directed radial flange 8 at the end thereof opposite the inwardly directed flange 7. A diaphragm 9, in the present instance, a washer-like disc in form projects radially outwardly from the sleeve 6 and is held in place against one radial face of the flange 8 by means of a ring 10, the bore of which has a press fit on the outer peripheral cylindrical portion of the sleeve 6 upon which the ring is fitted. By this arrangement the diaphragm 9 is clamped between the ring 10 and a radial face of the flange 8.

The outer peripheral edge of the diaphragm 9 is supported in the spindle housing 1. To this end the spindle housing bore is enlarged as at 11 to receive an annular ring 12 which in turn has an enlargement to receive a ring 14, the outer peripheral edge of the diaphragm 9 being secured between confronting axial faces of the rings 12 and 14 as shown in FIG. 1. By this arrangement there is provided an annular chamber 16, the axial walls of which are defined by the rings 10 and 14 and the radial walls of which are defined at one side by the diaphragm 9 and at the opposite side by the radial wall of the spindle housing 1. In order to provide an effective seal at the inner and outer peripheral edges of the diaphgram 9, suitable sealing means may be employed. It is noted that the diaphragm need not necessarily be made in a single piece as illustrated, and may consist of a number of thin films held together in a suitable manner, e.g. by means of a suitable adhesive.

For assembly purposes, the rolling bearing may be assembled to the spindle 2 and then the various rings and annular members defining the annular chamber 16 may be assembled to the bearing, after which the whole unit may be inserted into the spindle housing 1 as illustrated in FIG. 1. Thereafter a cover plate 15 may be provided and held in place against the ring 12 to prevent dirt and other foreign particles from entering the bearing from this axial end of the assembly.

In the device as described above, there will be formed an annular chamber 16, the walls of which comprise the diaphragm 9, a radial wall 17 of the enlargement 11 and the outer and inner circular walls respectively of the rings 10 and 14. The ring 10 preferably extends somewhat into the bore of the spindle housing 1 and is provided with an outwardly flaring end as at 30 formed by a groove 18 adjacent the end thereof. Since there is a certain amount of play between the bore of the spindle housing 1 and the ring 10, this gap is sealed by means of an elastic ring 19, a so-called O-ring, mounted on a tapering portion 32 of the ring 10.

By this means the ring 19 will always engage against the surface 17 and seal off the space between the bore 1a of the spindle housing 1 and the annular chamber 16. In addition to providing a seal this O-ring 19 which is made of rubber, plastic or similar material having good sealing qualities, will also have a damping effect on vibrations.

In accordance with the present invention means is provided for pressurizing the chamber 16 and for selectively regulating the pressure conditions therein. To this end, in the present instance, a radially directed conduit 20 is provided in the spindle housing 1 in communication at one end with one or more axial openings 21 terminating in the chamber 16. To the outer end of the conduit 20, a line 22 is connected through which pressure medium may be admitted from a suitable source. The pressure medium may consist of air which may be obtained, for example from the air pressure system frequently found in factories. A reduction valve 23 may be provided in the line 22 to regulate the pressure of the air to the chamber 16. This pressure may be read on the manometer 24 which is also in the line 22.

When the bearing mounting is completed and is to be adjusted, the bearing 3 is preloaded to eliminate play by admitting air at a certain pressure to the chamber 16, thus elastically deforming the flexible diaphragm 9 and thereby exerting an axial pressure through the sleeve 6 on the outer ring 5 of the bearing 3.

The amount of preloading may be indicated by means of a microcator device (not shown) applied to the end of the spindle 2 nearest to the diaphragm 9. The spindle 2 is supported at its other end by a fixed bearing (not shown) and the axial adjustment of the whole bearing mounting will thus take place entirely at the bearing 3 carried in the diaphragm 9. The play is thus eliminated by applying a certain pressure to the diaphragm 9, and since the chamber 16 is leak-proof, a constant pressure condition can be maintained. Should, however, deviation occur due for instance to variation in the grinding wheel and speed, changes in shape in the work piece or for other reasons, it is possible to adjust the pressure in the system in a very simple manner during running and thus once more attain the desired normal running conditions.

Another advantage with this bearing mounting is that deviations which occur when machining the sleeve 6 or wobble in the outer bearing race 5 is automatically compensated through the diaphragm 9, i.e., any inaccuracies in the bearing or its mountings will be automatically corrected from the beginning.

In certain cases it may be suitable to apply another manometer 25, indicated by broken lines in the drawing connected to the line 22 and having a scale which directly indicates the amount of play.

If desired, means may be provided in the line 22 for maintaining a substantially uniform pressure in the chamber 16. This means may consist of a pressure relief valve 40 as illustrated in FIG. 2 which automatically opens at a given pressure.

The valve comprises a valve housing 26 in which is mounted a spring-actuated ball 27 and a regulating screw 28 having a fine opening 29 communicating with the atmosphere. This valve may be used if it is desired to run the spindle at a constant pressure for a considerable time and thus will act in the manner of a safety valve as regards variations in pressure.

The device is particularly suitable for grinding wheel spindles running at high speeds of about 100,000 r.p.m.

The invention may be modified in various ways within the scope of the following claims. The pressure chamber may be formed in the most suitable manner for the bearing mounting in question and the mounting for the diaphragm may be varied according to the bearing type, etc. and the diaphragm may also be made of any suitable flexible elastic material. Any compressible, easily available medium may be used for the pressure medium.

While particular embodiments of the present invention have been illustrated and described herein, it is to be understood that changes and modifications may be made therein within the scope of the following caims.

I claim:

1. Mounting means for a bearing assembly for supporting a first member for rotation relative to a second member, said bearing assembly including an outer ring and an inner ring mounted on said first member, said means defining an annular chamber surrounding said outer ring, at least one wall of said chamber being defined by a flexible diaphragm and means for pressurizing said chamber thereby to exert an axial pressure on said outer ring.

2. A mounting means for a pair of members comprising a rolling bearing assembly supporting the members for relative movement consisting of a pair of annular members and a plurality of rolling elements between the annular members, a flexible diaphragm connected to one of said annular members and forming a wall of an enclosed chamber, said diaphragm being formed by a plurality of thin layers, means for pressurizing said chamber and means for selectively varying pressure in said chamber for selectively preloading the bearing assembly.

3. A mounting means for a pair of members comprising a rolling bearing assembly supporting the members for relative movement consisting of a pair of annular members and a plurality of rolling elements between the annular members, a flexible diaphragm connected to one of said annular members and forming a wall of an enclosed chamber, means for pressurizing said chamber and means for selectively varying pressure in said chamber for selectively preloading the bearing assembly, said bearing being mounted in a sleeve having a radially directed flange whereby the pressure medium in said chamber exerts a pressure on said flange through said diaphragm.

4. A mounting means for supporting a rotatable spindle in a housing, comprising a bearing assembly including an outer ring and an inner ring mounted on the spindle, means defining a chamber, at least one wall of said chamber being defined by a flexible diaphragm connected to one of said rings and means for pressurizing said chamber, another wall of said chamber being defined by the housing and sealed by means of an elastic ring, said ring causing a dampening effect on the spindle.

5. A bearing mounting according to claim 4 wherein the elastic ring is mounted on a grooved portion of a ring-like member forming an axial wall of the chamber.

References Cited by the Examiner

UNITED STATES PATENTS

| | | | |
|---|---|---|---|
| 2,956,843 | 10/1960 | Burgess | 308—219 |
| 2,972,504 | 2/1961 | Baker | 308—207 |
| 3,082,009 | 3/1963 | Whitley et al. | |

MARTIN P. SCHWADRON, *Primary Examiner.*

FRANK SUSKO, DAVID J. WILLIAMOWSKY,
*Examiners.*